United States Patent
Walczak

(10) Patent No.: US 7,814,858 B1
(45) Date of Patent: Oct. 19, 2010

(54) CONDITION INDICATOR FOR A MARINE COMPONENT

(75) Inventor: Thomas J. Walczak, Oconomowoc, WI (US)

(73) Assignee: Brunswick Corporation, Lake Forest, IL (US)

( * ) Notice: Subject to any disclaimer, the term of this patent is extended or adjusted under 35 U.S.C. 154(b) by 203 days.

(21) Appl. No.: 12/137,019

(22) Filed: Jun. 11, 2008

(51) Int. Cl.
*F16B 31/02* (2006.01)
(52) U.S. Cl. .................. 116/309; 116/307; 73/761
(58) Field of Classification Search ............ 116/306, 116/307, 309, 311–315, 319, 320, DIG. 1; 440/111; 73/761; 248/640; 411/114, 119, 411/121, 122
See application file for complete search history.

(56) References Cited

U.S. PATENT DOCUMENTS

| | | | |
|---|---|---|---|
| 682,876 A * | 9/1901 | Martin | 411/121 |
| 842,937 A * | 2/1907 | Chaddock | 411/98 |
| 843,840 A * | 2/1907 | Ogden | 411/121 |
| 1,184,930 A * | 5/1916 | Coulter | 411/120 |
| 1,292,970 A * | 1/1919 | Swann | 411/98 |
| 1,603,952 A * | 10/1926 | Huffer | 411/204 |
| 1,725,790 A | 8/1929 | Halagarda | |
| 4,331,430 A | 5/1982 | Lutzke et al. | |
| 4,545,770 A | 10/1985 | Ferguson | |
| 4,666,410 A | 5/1987 | Anselm | |
| 4,930,744 A | 6/1990 | Woodard et al. | |
| 5,009,619 A | 4/1991 | Meier | |
| 5,044,599 A | 9/1991 | Binversie et al. | |
| 5,052,956 A | 10/1991 | Binversie et al. | |
| 5,178,568 A | 1/1993 | Binversie et al. | |
| 5,624,218 A | 4/1997 | Dauwalter | |
| 6,158,933 A * | 12/2000 | Nicholson | 411/14 |
| 6,227,920 B1 | 5/2001 | Alby et al. | |
| 7,484,420 B2 * | 2/2009 | Schuster et al. | 73/761 |
| 2004/0136806 A1 * | 7/2004 | Montgomery et al. | 411/122 |

FOREIGN PATENT DOCUMENTS

| | | | |
|---|---|---|---|
| GB | 2 242 720 A | | 10/1991 |
| GB | 2 325 505 A | | 11/1998 |
| GB | 2 343 726 A | | 5/2000 |
| GB | 2 393 488 A | | 3/2004 |
| GB | 2 406 365 A | | 3/2005 |
| GB | 2 409 888 A | | 7/2005 |
| JP | 04203614 A | * | 7/1992 |
| JP | 11159513 A | * | 6/1999 |
| KR | 2007047741 A | * | 5/2007 |
| WO | WO 8700592 A1 | * | 1/1987 |

* cited by examiner

*Primary Examiner*—R. Alexander Smith
(74) *Attorney, Agent, or Firm*—William D. Lanyi

(57) ABSTRACT

A condition indicator is provided to visually indicate a rotation of a nut relative to a bolt used to attach a transom bracket to a transom of a marine vessel. An indicator is configured to rotate with the nut and a pointer of the indicator can visually be identified as representing a rotation of the nut relative to the bolt. A retainer is provided to prevent the head of the bolt from rotating about its central axis.

22 Claims, 2 Drawing Sheets

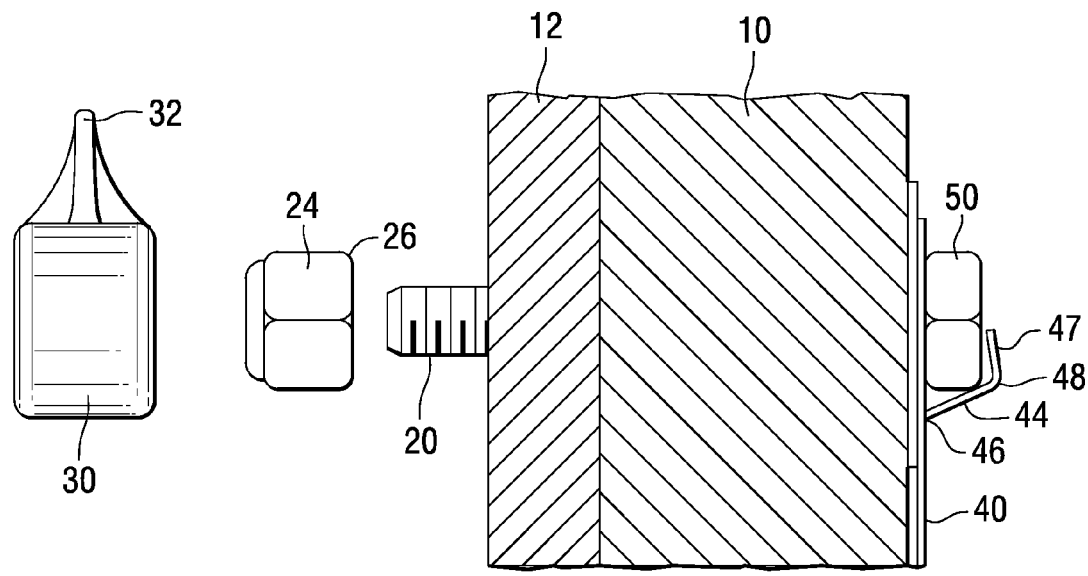
FIG. 1
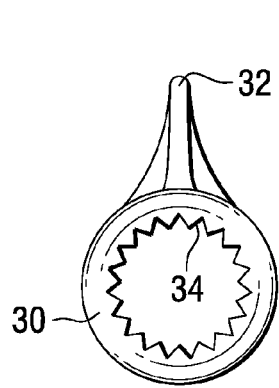 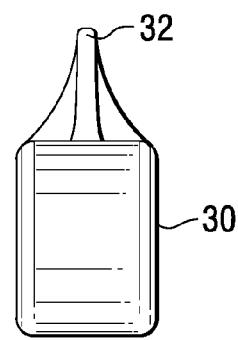 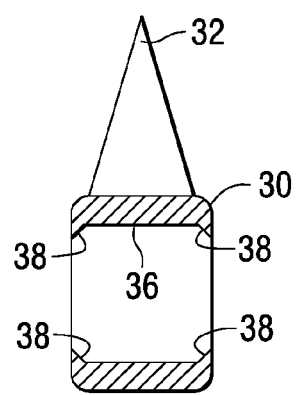
FIG. 2　　FIG. 3　　FIG. 4

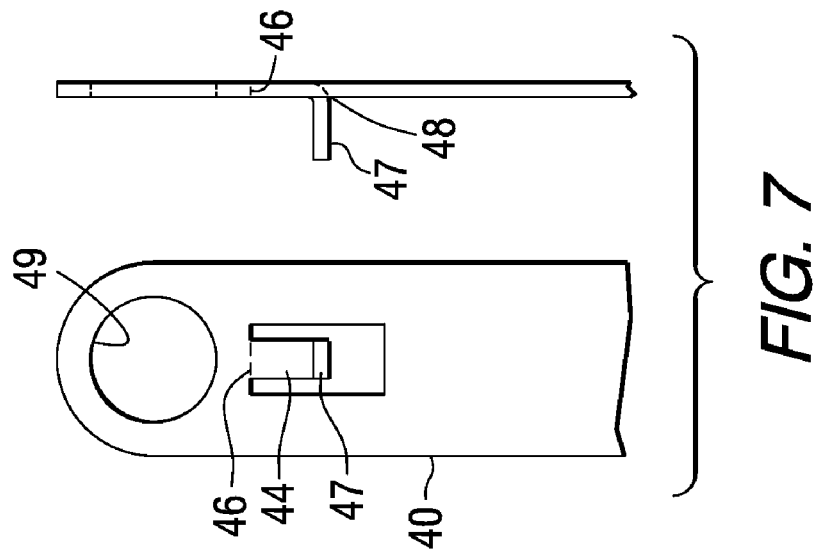
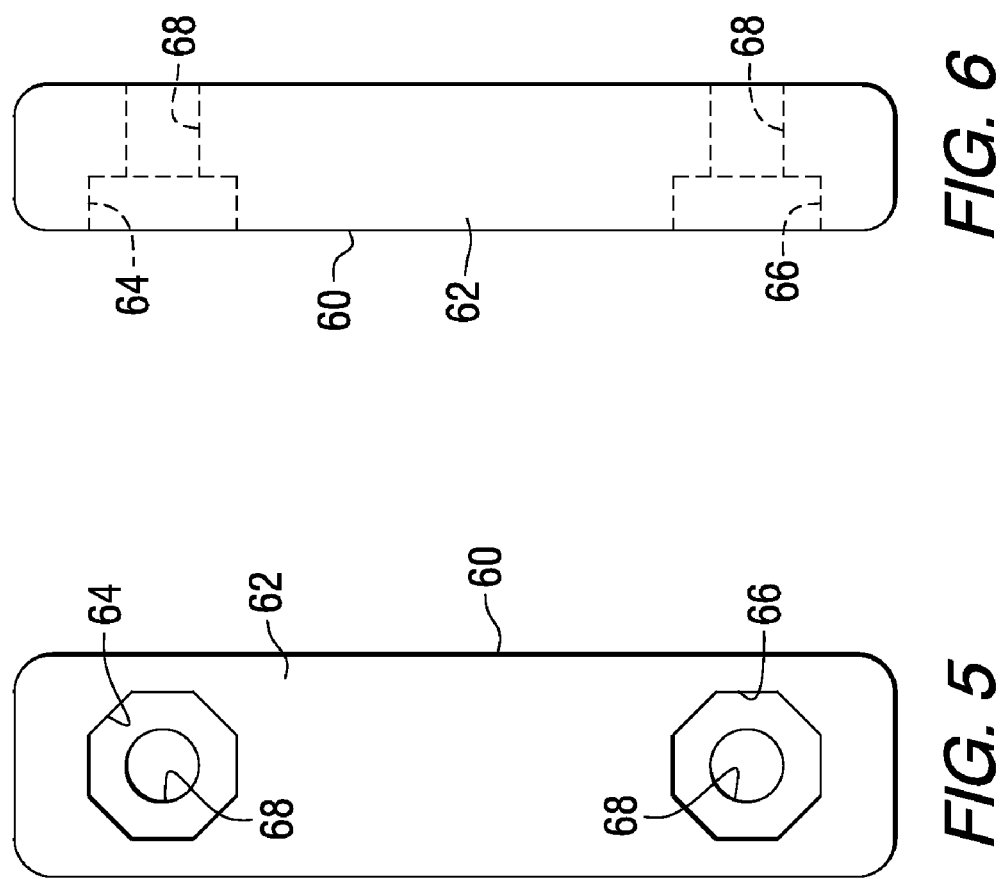

CONDITION INDICATOR FOR A MARINE COMPONENT

BACKGROUND OF THE INVENTION

1. Field of the Invention

The present invention is generally related to a condition indicator and, more particularly, to an indicator which provides information relating to the attachment condition of one or more fasteners used to retain an outboard motor to the transom of marine vessel.

2. Description of the Related Art

Those skilled in the art of marine vessels and marine propulsion devices are familiar with various ways in which outboard motors are attached to the transom of a marine vessel. Typically, a transom bracket is attached to the rear surface of a boat transom and the transom bracket is configured to support an outboard motor in a manner that allows the outboard motor to be tilted about a generally horizontal axis and steered about a generally vertical axis. Depending on the size of the outboard motor, various types of threaded clamps or bolts can be used to perform the function of attaching the transom bracket to the transom of a marine vessel. Relatively small outboard motors can be attached to the transom through the use of manually rotatable thumb screws. Larger outboard motors are typically attached to the transom through the use of a plurality of bolts that extend through both the transom and the transom bracket. In this latter situation, the nuts used to attach the bolts to the transom and transom bracket can inadvertently become loosened. Various techniques are known to those skilled in the art for inhibiting the loosening of the nut from a bolt. In addition, some techniques are known for visually indicating this loosening, particularly in the case of nuts that are used to retain wheels to land vehicles.

U.S. Pat. No. 1,725,790, which issued to Halagarda on Aug. 27, 1929, describes a lock nut. The invention's object is to provide lock nuts used in pairs which may be conveniently applied to the nuts of threaded bolts and will be effective for preventing displacements. This device permits the convenient removal of the bolts and provides springs which are coiled on the nuts.

U.S. Pat. No. 4,331,430, which issued to Lutzke et al. on May 25, 1982, discloses a trim mechanism with an automatic return. A tilt mechanism for a marine propulsion device has a swivel bracket pivotally attached to a transom bracket. A trim pin is carried by a trim pin carrier which is pivotally attached to the swivel bracket.

U.S. Pat. No. 4,545,770, which issued to Ferguson on Oct. 8, 1985, describes an outboard motor mounting arrangement. It includes a transom bracket having a mounting portion fixed to the rear of a boat transom below the upper edge thereof and a pair of laterally spaced arms extending upwardly from the mounting portion and including respective upper ends located rearwardly of the boat transom and above the upper edge thereof.

U.S. Pat. No. 4,666,410, which issued to Anselm on May 19, 1987, describes a mounting arrangement for a marine propulsion device. The device comprises a transom bracket adapted to be fixedly connected to the transom, a swivel bracket pivotally connected to the transom bracket for vertical swinging movement about a horizontal tilt axis, and a kingpin having upper and lower ends fixed to the swivel bracket and a central portion intermediate the ends.

U.S. Pat. No. 4,930,744, which issued to Woodard et al. on Jun. 5, 1990, describes a programmed mechanism for selectively locating swivel brackets relative to transom brackets. It comprises a swivel bracket pivotally connected to the propulsion unit for relative steering movement therebetween about a steering axis, a link pivotally connected at one end to the swivel bracket about an axis transverse to the steering axis and having a laterally outwardly extending out-turned end, and a transom bracket adapted to be mounted on a transom of a boat.

U.S. Pat. No. 5,009,619, which issued to Meier on Apr. 23, 1991, describes a corrosion protection system. A marine propulsion device includes a transom bracket fabricated of a metal which is less noble than another metal from which a transom is fabricated. It also includes a mechanism for detachably mounting the transom bracket on the transom and for simultaneously electrically insulating the transom bracket from the transom.

U.S. Pat. No. 5,044,599, which issued to Binversie et al. on Sep. 3, 1991, describes a cover for transom bracket mounting screws. The apparatus comprises a transom bracket including an upper portion and a portion extending downwardly from the upper portion and having a surface adapted to engage the boat transom. It also comprises means including a bolt member for releasably clamping the downwardly extending portion to the boat transom.

British Patent GB 2,242,720, which issued to Marczynski et al. and published on Sep. 10, 1991, describes a looseness indicator for fasteners. A safety indicating device is provided to indicate whether or not a vehicle wheel nut has become loose on its stud. It comprises a body and a pointer. The body has grooves enabling the device to be releasably secured to a nut so that the pointer points towards a reference mark.

U.S. Pat. No. 5,052,956, which issued to Binversie et al. on Oct. 1, 1991, describes a marine propulsion device with a dual position tilt lock. It comprises a transom bracket adapted to be mounted on a boat transom and including an upper surface, a swivel bracket connected to the transom bracket for pivotal movement about a horizontal tilt axis, a holding member pivotally mounted on the swivel bracket for movement about a horizontal second axis between a park position, a low-tilt position, and a high-tilt position.

U.S. Pat. No. 5,178,568, which issued to Binversie et al. on Jan. 12, 1993, describes a marine propulsion device with a trailing mechanism including a positive mechanical latch. It comprises a transom bracket adapted to be mounted on a boat transom and including laterally spaced rearwardly extending port and starboard portions. It also comprises a swivel bracket including a first leg connected to the transom bracket for pivotal movement about a horizontal axis and a second leg extending generally perpendicularly to the first leg and including a transversely extending portion extending in closely adjacent relation to both of the rearwardly extending laterally spaced transom bracket portions.

U.S. Pat. No. 5,624,218, which issued to Dauwalter on Apr. 29, 1997, describes a safety lock device for screw fasteners. It is intended to indicate tightness of the fasteners or looseness of either or both of two fasteners. It additionally limits counter rotation of either fastener to a small fraction of a turn. It is characterized by a pair of replaceable caps anchored to each fastener and a loose lanyard extending between the caps when the fasteners are in tightened condition.

British Patent GB 2,325,505, which issued to Marczynski et al. and was published on Nov. 25, 1998, describes a wheel nut position indicator and dust cap. The indicator comprises a body with an integral pointer. The body has a central bore provided with splines or grooves which engage a wheel nut in one of a plurality of positions, such that the pointer is aligned relative to a florescent reference mark.

British Patent GB 2,343,726, which issued to Marczynski et al. and was published on May 17, 2000, describes an indicating loosening of a nut or bolt. The nut or bolt has a mounting element permanently fixed to or integral with it and an indicator element is non-rotatably mounted on the mounting element in one of a plurality of positions. Loosening is indicated by movement of the indicator relative to a reference.

U.S. Pat. No. 6,227,920, which issued to Alby et al. on May 8, 2001, discloses a fastener for attaching an outboard motor to a transom of a boat. It comprises an elongated opening formed in a first component with the elongated opening having a plurality of similarly shaped portions. An insert is disposable into each one of the plurality of similarly shaped portions and can be square in a preferred embodiment. Each of the plurality of the similarly shaped portions of the elongated opening is shaped to receive the insert therein. The insert is limited in movement by the elongated opening to a direction that is perpendicular to the plane of the elongated opening. A hole is formed in the second component and a cylindrical member is disposed through the insert, through the hole, and through the elongated opening.

British Patent GB 2,393,488, which issued to Brawley and was published on Mar. 31, 2004, describes a wheel nut indicator mount. The mount has a body with a socket for engagement with a wheel nut and supports a wheel nut indicator in a desired orientation of the body displaced axially outwardly of the wheel nut. Preferably, two or more of the mounts can be stacked together to enable the wheel nut indicator to be used when a step ring is fitted to the vehicle wheel.

British Patent GB 2,406,365, which issued to Marczynski et al. and was published on Mar. 30, 2005, describes a security device which comprises a pair of sockets for fitting onto a pair of adjacent nuts or bolts. The sockets are permanently connected to each other by an intermediate link. Preferably each socket is provided with a pointer and the intermediate link with at least one pointer as an indicator means.

British Patent GB 2,409,888, which issued to Thomson et al. and was published on Jul. 13, 2005, describes a rotation indicator for screw threaded connectors used to secure railway tracks. It involves a plastic cap which carries an arrow or other indicator aligned with a datum. The indicator allows the loosening of the screw threaded connector to be detected. Other rotational indicators disclosed in this British patent include a transmitter attached to the screw threaded connector and mixing two chemicals to emit thermal or visible radiation.

The patents described above are hereby expressly incorporated by reference in the description of the present invention.

The patents described above relate to the prevention of rotation of nuts relative to associated bolts and the indication of the loosening of nuts from bolts. Some of the patents described above illustrate various ways to attach a transom plate to a transom of a marine vessel. Some of the patents identified above relate to land vehicles, such as trucks, and provide visual indications that nuts have become loose relative to associated studs of the vehicle. It would be significantly beneficial if an indicator system could be provided that identified the loosening of a nut relative to a bolt used to attach an outboard motor to a transom of a marine vessel. This would be particularly useful in view of the fact that many such attachment schemes utilize bolt and nut combinations in which either the nut or the head of the bolt can possibly rotate relative to stationary components, such as the transom or transom bracket, and any rotation of the bolt itself can defeat the applicability of an indicator which is designed to merely indicate the rotation of the nut relative to the transom bracket. Therefore, it would be particularly beneficial if an indicator device could be provided in which the head of a bolt can be retained in position while a nut attached to the bolt can be provided with an indicator that would indicate the relative rotation between the nut and the head of the bolt in addition to indicating the relative rotation between the nut and the transom bracket or transom.

SUMMARY OF THE INVENTION

An attachment condition indicator of a marine component, made in accordance with a preferred embodiment of the present invention, comprises an indicator which is removably attachable to a nut and a retainer which is configured to inhibit a head of a threaded fastener from rotating relative to a structure, such as a transom, when the threaded fastener is inserted through an opening in the structure. The indicator is configured to visually indicate rotation of the nut relative to the threaded fastener when the threaded fastener is inserted through a first opening in a component, such as a transom bracket. The threaded fastener is inserted through a second opening in the transom. The first and second openings are aligned with each other and the threaded fastener and nut are configured to cooperate with each other to provide a clamping force which urges the component against the structure.

In a particularly preferred embodiment of the present invention, the structure is a transom of a marine vessel and the component is a transom bracket of an outboard motor. The transom is disposed between the head of the threaded fastener and the component and the component is disposed between the nut and the transom.

In one embodiment of the present invention, the retainer comprises a plate member having a depression which is shaped to receive the head of the threaded fastener therein. Alternatively, in another embodiment of the present invention, the retainer comprises a tab which is movable into contact with the head of the threaded fastener to inhibit the head from rotating relative to the retainer. The tab can be deformable and shaped to be bent over a portion of the head.

The indicator can comprise a protrusion which is shaped to require a removal force greater than a predetermined minimum to cause the indicator to move away from its retention position relative to the nut.

BRIEF DESCRIPTION OF THE DRAWINGS

The present invention will be more fully and completely understood from a reading of the description of the preferred embodiment in conjunction with the drawings, in which:

FIG. 1 is an exploded section view of one embodiment of the present invention associated with a transom and transom bracket of a marine vessel;

FIGS. 2 and 3 show two views of an indicator made in accordance with one embodiment of the present invention;

FIG. 4 is a section view of an indicator made in accordance with a preferred embodiment of the present invention;

FIGS. 5 and 6 show two views of a retainer made in accordance with one embodiment of the present invention; and FIG. 7 shows an alternative embodiment of a retainer of the present invention.

DESCRIPTION OF THE PREFERRED EMBODIMENT

Throughout the description of the preferred embodiment of the present invention, like components will be identified by like reference numerals.

FIG. 1 is a simplified representation of a transom 10 of a marine vessel and a transom bracket 12 attached thereto. These components are shown in section view. A threaded fastener 20 extends through a first opening formed in the transom 10 and a second opening formed through the transom bracket 12. A nut 24 is configured to be threaded onto the threads formed on the cylindrical body of the threaded fastener. An indicator 30 is removably attachable to the nut 24 and a pointer 32 is configured to visually indicate the rotation of the nut 24 relative to the threaded fastener 20. A retainer 40 is configured to inhibit a head 50 of the threaded fastener 20 from rotating relative to the structure, such as the transom 10 when the threaded fastener 20 is inserted through the second opening formed in the structure 10. One embodiment of the present invention provides the retainer 40 with a tab 44 that is movable into contact with the head 50 in order to inhibit the head 50 from rotating relative to the retainer 40.

FIGS. 2 and 3 show two views of the indicator 30. As can be seen, the pointer 32 extends in a direction radially away from the body of the indicator 30. The central portion of the indicator comprises a plurality of facets 34 that allow the indicator 30 to be placed over the nut 24, described in FIG. 1, in a plurality of angular positions so that the pointer 32 can be placed in a desired direction that can easily be remembered by the operator of a marine vessel. The indicator 30 can be assembled onto the nut 24 so that the pointer 32 can be aligned with a marker, such as another nut, or any visual indicator that can assist the operator of the marine vessel in quickly identifying the movement of the pointer 32 relative to that reference. The positioning of the pointer 32 can be as simple as directing it in a straight upward direction or horizontal direction or, alternatively, it can be directed to point toward a recognizable object. As long as the operator of the marine vessel can visually recognize movement of the pointer 32, its function will be satisfied.

FIG. 4 is a section view of the indicator 30 which shows protrusions 38 associated with the inner surface 36. With reference to FIGS. 1-4, these protrusions 38 are intended to snap over an inwardly positioned edge 26 of the nut 24 in order to retain the indicator in position relative to the nut. In certain embodiments of the present invention, the protrusions 38 do not necessarily extend around the entire circumference of the inner surface 36. Instead, the protrusions 38 can cover only a few of the facets 34 at each axial end of the indicator 30. Even if the protrusions 38 extend only around a relatively small arcuate distance of the inner surface 36, they will adequately serve the purpose of retaining the indicator 30 on the nut 24 and requiring a removal force which is greater than a minimal magnitude and which is exerted against the indicator 30 in a direction away from the component 12, such as the transom bracket. It should be understood that alternative attachment techniques can be used to require this minimal force and to generally retain the indicator 30 in position on the nut 24. If the nut 24 rotates relative to the threaded fastener 20, the pointer 32 will move to a different circumferential position and indicate this loosening. This basic type of indication is described and illustrated in British Patent GB 2,242,720 in relation to studs of wheels associated with land vehicles.

FIGS. 5 and 6 show two views of a retainer 60 made in accordance with one embodiment of the present invention. The retainer 60 comprises a plate member 62 that has a depression 64 which is shaped to receive the head 50 of the threaded fastener 20 as described in conjunction with FIG. 1. With continued reference to FIGS. 1, 5 and 6, the head 50 is disposed within the hexagonally is shaped depression 64. This prevents the head 50 from rotating relative to the retainer 60. In one embodiment of the present invention, two depressions, 64 and 66, are provided so that the retainer 60 is prevented from rotating relative to either of the two bolt heads disposed on these depressions. Openings 68 allow the cylindrical body of the threaded fastener 20 to extend through the thickness of the retainer 60. With two threaded fasteners 20 disposed through the holes 68 and their heads disposed within depressions 64 and 66, the retainer 60 is held in its intended position and the retainer 60 prevents either of the heads 50 of the two threaded fasteners from rotating relative to the retainer 60, the transom 10, or the transom bracket 12. This prevents the indicator from rotating relative to the transom bracket 12 as a result of rotation of the entire threaded fastener 20 about its central axis.

FIG. 7 shows an alternative embodiment of the retainer 40. It is similar to the retainer 40 described above and illustrated in FIG. 1. A tab 44 extends from a portion of the retainer 40 and is bendable about two lines. With reference to FIGS. 1 and 7, the tab 44 can be bent about a line represented by dashed line 46 to raise the tab 44 upwardly away from the plane of the retainer 40 and rotated about dashed line 46. In addition, a distal extension 47 can be bent about point 48 as illustrated in FIGS. 1 and 7. This allows the distal end 47 to be moved into retaining association with the head 50 of the threaded fastener 20 to prevent its rotation relative to the retainer 40. It should be understood that the retainer 40 is generally symmetrical about its center and two openings, 49, provide the same type of symmetry that is provided by the openings 68 described above in conjunction with FIGS. 5 and 6. As a result, the retainer 40 can be positioned so that two threaded fasteners, or bolts, extend through its two holes 49. This has the beneficial result of preventing the retainer 40 from moving relative to those two bolts and, in conjunction with the tabs 44, preventing the heads of those bolts from rotating relative to the retainer 40.

Comparing the two views in FIG. 7 to the views in FIGS. 5 and 6, it can be seen that the retainer 40 can be made of a thinner material than the retainer 60. However, it should be understood that each of these alternative designs of retainer provides benefits relative to the other. The retainer 60 can be manufactured in a way that is more rugged than retainer 40, particularly when the retainer 60 is used during assembly to hold the head of the bolt in position within an inaccessible space while the nut is threaded onto the other end of the bolt. The depressions, 64 and 66, can serve the purpose of a holder that retains the heads of the bolts in position while an assembler works on an opposite side of the transom to attach the nuts. Although the tab 44 can also serve this purpose, it may not be as rugged in retaining the position of the bolt head if the material of the retainer 40 is relatively thin. In other words, the strength of the tab 44 required to hold the bolt head in position during normal use is probably less than the strength required to retain the position of the head as the nut is tightened onto the bolt with considerable force.

As described and illustrated in the numerous United States and British patents identified above, the indication of a loosening nut through the use of an indicator is not, in itself, a novel concept. It has been known in relation to vehicle wheels for many years. However, it should be noted that vehicle wheels use studs that are rigidly attached to, or integral with, another structure and the rotation of the studs about their respective central axes is impossible. Therefore, if the rotation of a nut relative to the stud is indicated, this indication is sufficient to warn an operator of a loosening nut. However, in applications where a nut is attached to a threaded fastener that is, itself, rotatable about its central axis, rotation of the threaded fastener, such as a bolt, in combination with a loosening of the nut relative to the fastener, can be masked. In other words, an indicator of a loosened nut can point to a proper position even if it has rotated relative to the bolt in cases where the bolt itself has rotated relative to the transom and/or transom bracket of a marine vessel. By combining an indicator with a retainer, as in the embodiments of the present invention described above, this unfortunate combination of events can be prevented. As a result, any loosened nut will be identified by a movement of the pointer of an indicator because the head of the bolt remains stationary and unmoved relative to the transom and transom bracket.

Some of the United States and British patents identified above also illustrate types and applications of transom brackets relative to marine vessel transoms, and types of loose nut indicators that are used on land vehicles and railroad rails. However, the present invention addresses a situation in which a rotatable bolt is retained in position to prevent its rotation about its central axis and a nut associated with that bolt is provided with an indicator that visually shows any rotation of the nut relative to the stationary bolt.

With continued reference to FIGS. 1-7, it can be seen that an attachment condition indicator of a marine component made in accordance with various alternative embodiments of the present invention, comprises an indicator 30 that is removably attachable to a nut 24. The indicator 30 is configured to visually indicate rotation of the nut 24 relative to a bolt 20, or other type of threaded fastener, when the bolt is inserted through a first opening in a component, such as a transom bracket. A retainer, 40 or 60, is configured to inhibit a head 50 of the bolt 20 from rotating relative to the transom 10 when the bolt 20 is inserted through a second opening formed through the transom. The first and second openings are aligned with each other when the transom bracket 12 is attached to the transom 10 and the bolt 20 extends through both. The bolt and the nut 24 are configured to cooperate with each other to provide a clamping force which urges the transom is bracket 12 against the transom 10. The transom 10 is disposed between the head 50 and the transom bracket 12 and the transom bracket 12 is disposed between the nut 24 and the transom 10. The indicator 30 can comprise a protrusion 38 that is shaped to require a removal force greater than a predetermined minimum to cause the indicator 30 to move away from its retention position relative to the nut 24. The retainer 60 has a depression, 64 and 66, which is shaped to receive the head 50 of the bolt 20 therein. The retainer 40 can comprise a deformable tab 44 which is movable into contact with the head 50 of the bolt 20 in order to inhibit the head 50 from rotating relative to the retainer 40 by being bent over a portion of the head 50.

Although the present invention has been described with particular specificity and illustrated to show several embodiments, it should be understood that alternative embodiments are also within its scope.

I claim:

1. An attachment condition indicator of a marine component, comprising:
    an indicator which is removably attachable to a nut, said indicator being configured to visually indicate rotation of said nut relative to a threaded fastener when said threaded fastener is inserted through a first opening in a component; and
    a retainer which is configured to inhibit a head of said threaded fastener from rotating relative to a structure when said threaded fastener is inserted through a second opening in said structure, said first and second openings being aligned with each other, said threaded fastener and said nut being configured to cooperate with each other to provide a clamping force which urges said component against said structure.

2. The indicator of claim 1, comprising a structure member providing said structure, and comprising a component member providing said component, wherein:
    said structure is a transom of a marine vessel and said component is a transom bracket of an outboard motor.

3. The indicator of claim 2, wherein:
    said transom is disposed between said head and said component.

4. The indicator of claim 2, wherein:
    said component is disposed between said nut and said transom.

5. The indicator of claim 1, wherein:
    said retainer comprises a plate member having a depression which is shaped to receive said head of said threaded fastener therein.

6. The indicator of claim 1, wherein:
    said retainer comprises a tab which is movable into contact with said head of said threaded fastener to inhibit said head from rotating relative to said retainer.

7. The indicator of claim 6, wherein:
    said tab is deformable and shaped to be bent over a portion of said head.

8. The indicator of claim 1, wherein:
    said indicator comprises a protrusion which is shaped to require a removal force greater than a predetermined minimum magnitude to cause said indicator to move away from its retention position relative to said nut.

9. The indicator of claim 8, wherein:
    said removal force to cause said indicator to move away from said retention position relative to said nut is along an axially extending direction;
    said nut has an outer periphery and first and second axial ends, said first axial end facing in a first axial direction towards said head, said second axial end facing axially in a second opposite axial direction;
    said first axial end has an inwardly positioned edge positioned radially inwardly of said outer periphery;
    said protrusion extends radially inwardly to an inner reach radially inwardly of said outer periphery to engage said inwardly positioned edge in snap over relation to retain said indicator in said retention position relative to said nut.

10. The indicator of claim 9, wherein said indicator is retained in said retention position by detent engagement of said protrusion along said second axial direction against said inwardly positioned edge upon attempted movement of said indicator along said second axial direction.

11. The indicator of claim 1, comprising a structure member providing said structure, and comprising a component member providing said component, wherein:
    said component is disposed between said nut and said structure.

12. The indicator of claim 1, comprising a structure member providing said structure, and comprising a component member providing said component, wherein:
    said structure is disposed between said head and said component.

13. An attachment condition indicator of a marine component, comprising:
    an indicator which is removably attachable to a nut, said indicator being configured to visually indicate rotation of said nut relative to a threaded fastener when said threaded fastener is inserted through a first opening in a transom bracket; and
    a retainer which is configured to inhibit a head of said threaded fastener from rotating relative to a transom when said threaded fastener is inserted through a second opening in said transom, said first and second openings being aligned with each other, said threaded fastener and said nut being configured to cooperate with each other to provide a clamping force which urges said transom bracket against said transom.

14. The indicator of claim 13, comprising a structure member providing said structure, and comprising a component member providing said component, wherein:
said transom is disposed between said head and said transom bracket and said transom bracket is disposed between said nut and said transom.

15. The indicator of claim 14, wherein:
said retainer comprises a plate member having a depression which is shaped to receive said head of said threaded fastener therein.

16. The indicator of claim 14, wherein:
said retainer comprises a tab which is movable into contact with said head of said threaded fastener to inhibit said head from rotating relative to said retainer.

17. The indicator of claim 16, wherein:
said tab is deformable and shaped to be bent over a portion of said head.

18. The indicator of claim 13, wherein:
said indicator comprises a protrusion which is shaped to require a removal force greater than a predetermined minimum magnitude to cause said indicator to move away from its retention position relative to said nut.

19. An attachment condition indicator of a marine component, comprising:
an indicator which is removably attachable to a nut, said indicator being configured to visually indicate rotation of said nut relative to a bolt when said bolt is inserted through a first opening in a transom bracket; and
a retainer which is configured to inhibit a head of said bolt from rotating relative to a transom when said bolt is inserted through a second opening in said transom, said first and second openings being aligned with each other, said bolt and said nut being configured to cooperate with each other to provide a clamping force which urges said transom bracket against said transom, said transom being disposed between said head and said transom bracket, said transom bracket being disposed between said nut and said transom.

20. The indicator of claim 19, wherein:
said indicator comprises a protrusion which is shaped to require a removal force greater than a predetermined minimum magnitude to cause said indicator to move away from its retention position relative to said nut.

21. The indicator of claim 20, wherein:
said retainer comprises a plate member having a depression which is shaped to receive said head of said bolt therein.

22. The indicator of claim 20, wherein:
said retainer comprises a deformable tab which is movable into contact with said head of said bolt to inhibit said head from rotating relative to said retainer by being bent over a portion of said head.

\* \* \* \* \*